US012202294B2

(12) United States Patent
Malinverni

(10) Patent No.: US 12,202,294 B2
(45) Date of Patent: Jan. 21, 2025

(54) WRITING INSTRUMENTS

(71) Applicant: SOCIÉTÉ BIC, Clichy (FR)

(72) Inventor: Samuel Malinverni, Clichy (FR)

(73) Assignee: SOCIÉTÉ BIC, Clichy (FR)

( * ) Notice: Subject to any disclaimer, the term of this patent is extended or adjusted under 35 U.S.C. 154(b) by 0 days.

(21) Appl. No.: 18/254,725

(22) PCT Filed: Nov. 22, 2021

(86) PCT No.: PCT/EP2021/082471
§ 371 (c)(1),
(2) Date: May 26, 2023

(87) PCT Pub. No.: WO2022/112160
PCT Pub. Date: Jun. 2, 2022

(65) Prior Publication Data

US 2024/0300259 A1 Sep. 12, 2024

(30) Foreign Application Priority Data

Nov. 26, 2020 (EP) .................................... 20306451

(51) Int. Cl.
*B43K 23/12* (2006.01)
*B43K 24/00* (2006.01)
*B43K 29/02* (2006.01)

(52) U.S. Cl.
CPC .............. *B43K 23/12* (2013.01); *B43K 24/00* (2013.01); *B43K 29/02* (2013.01)

(58) Field of Classification Search
CPC ........ B43K 23/12; B43K 24/00; B43K 29/02; B43K 23/08; B43K 24/06; B43K 24/10; B43K 24/14; B43K 24/146
(Continued)

(56) References Cited

U.S. PATENT DOCUMENTS 1,580,183 A 4/1926 Alfred
2,069,462 A 2/1937 Rouse
(Continued)

FOREIGN PATENT DOCUMENTS

WO 2020222141 A1 11/2020

OTHER PUBLICATIONS

International Search Report and Written Opinion issued in International Application No. PCT/EP2021/082471, mailed on Feb. 21, 2022.

(Continued)

*Primary Examiner* — David J Walczak
(74) *Attorney, Agent, or Firm* — Bookoff McAndrews, PLLC

(57) ABSTRACT

An ink writing instrument comprising a body extending along an axis and having a first end, the first end being provided with a writing tip and with an eraser, the eraser is movable along the axis with regard to the body, a helical-cam propelling mechanism being configured to move the eraser along the axis between a retracted position and a protruded position, the helical-cam propelling mechanism comprising a helical cam radially protruding from one of the eraser and the body, and two cam followers arranged on the other of the eraser and the body, the two cam followers axially sandwiching the helical cam at least when the eraser is moved between the retracted position and the protruded position.

20 Claims, 8 Drawing Sheets

(58) Field of Classification Search
USPC ................. 401/29, 32, 37, 116; 15/429, 430
See application file for complete search history.

(56) References Cited

U.S. PATENT DOCUMENTS

| | | | | |
|---|---|---|---|---|
| 2,815,002 | A | 12/1957 | Charley | |
| 5,127,130 | A | 7/1992 | Copito | |
| 8,915,663 | B2 * | 12/2014 | Rolion ................ | B43K 21/003 15/433 |
| 9,409,438 | B2 | 8/2016 | Ohtsuka | |
| 2015/0043957 | A1 | 2/2015 | Bez | |
| 2015/0184003 | A1 | 7/2015 | Li | |

OTHER PUBLICATIONS

Bic Corporation. BIC-WC6ST76AST Bic DUO Ballpoint Pen/Highlighter Combo. Office Quarters ® Cut Out the Middleman, Website Design and Development by Albany NY's WSG. https://www.officequarters.com/product.php/item/BIC-WC6ST76AST/BICWC6ST76AST.html.

* cited by examiner

WRITING INSTRUMENTS

This is a National Stage Application under 35 U.S.C. § 371 of International Application No. PCT/EP2021/082471, filed on Nov. 22, 2021, now published as WO 2022/112160 A1, which claims priority to European Patent Application No. 20306451.4, filed on Nov. 26, 2020, its content being incorporated herein by reference.

TECHNICAL FIELD

The present disclosure relates to an ink writing instrument provided with an eraser disposed at the front end.

BACKGROUND

Traditional retractable ink writing instruments are usually provided with an eraser disposed at the rear end, onto the button for actuating the writing tip. However, when the button is actuated in order to project/retract the writing tip, the user contacts the eraser with his fingers/thumb and makes it dirty. A solution consists in providing a protective cap for the eraser. However, such an additional cap has a negative impact on the manufacturing costs and it is often lost by the user. Another solution is to place the eraser at another place on the writing instrument. However, the resulting structure is usually complex and presents a relatively big size which is not user-friendly. Therefore a need exists to provide a user-friendly ink instrument having an eraser which is prevented from being touched by the user and a writing tip which may be easily protected when not used.

Document WO2020222141A1 discloses a writing implement having a writing tip extending from a barrel and a rubbing element surrounding the writing tip that is selectively extendable from a housing. Document US20150043957A1 discloses a writing instrument including a barrel, a tip mounted at the front of the barrel, and a protective sleeve for the tip.

SUMMARY

In embodiments, a writing instrument comprises a body extending along an axis, the body having a first end and a second end opposed to the first end along the axis, the first end being provided with a writing tip and with an eraser, wherein the writing tip is configured to be fed with ink and the eraser is movable along the axis with regard to the body, the ink writing instrument further comprises a helical-cam propelling mechanism configured to move the eraser along the axis between a retracted position and a protruded position, and the helical-cam propelling mechanism comprises a helical cam/helical cam portion (or a first helical cam/first helical cam portion) radially protruding from one of the eraser and the body, and two cam followers arranged on the other of the eraser and the body, the two cam followers axially sandwiching the helical cam at least when the eraser is moved between the retracted position and the protruded position.

The first end is the front end and the second end is the rear end. The writing tip may be a felt tip, a ballpoint tip or any other means making it possible to write on a substrate or surface with ink. In the following, and unless otherwise specified, "writing instrument" should be understood as "ink writing instrument".

The eraser can axially move with regard to the body and the writing tip cannot move (in normal use) with regard to the body.

In the protruded position the eraser may be able to be used for erasing while the writing tip may be not able to be used for writing. In the retracted position the eraser may be not able to be used for erasing while the writing tip may be able to be used for writing. For example, in the protruded position, the eraser may protect the writing tip, e.g. from contact/interaction with an external environment.

For example, the helical cam may be formed on the eraser. In such a case the helical cam may protrude radially outward. The two cam followers (or the pair of cam followers/first pair of cam followers) may be formed on the body. For example the two cam followers may protrude radially inward. In another example, the helical cam may be formed on the body. In such a case the helical cam may protrude radially inward. The two cam followers may be formed on the eraser. For example the cam followers may protrude radially outward.

For example, the two cam followers may always axially sandwich the helical cam. In another example, the two cam followers may axially sandwich the helical cam only when moving the eraser between the retracted position and the protruded position. For example, the two cam followers may be configured to sandwich the helical cam and axially held the eraser in the protruded position. For example, the two cam followers may be configured to sandwich the helical cam and axially held the eraser in the retracted position.

The eraser disposed on the first end and actuated by a helical-cam propelling mechanism may prevent the user from touching the eraser. The helical-cam propelling mechanism has a relatively simple structure and the writing instrument may have a relatively small size and may be ergonomic/easy to use. The retractable eraser disposed on the first end may provide the same effect as a retractable writing tip: the writing tip may be protected when not used and available for use by a simple actuation of an element of the writing instrument.

In embodiments, the writing tip may be fixed with regard to the body.

In embodiments, the eraser and the writing tip may be at least in part coaxial. All or part of the eraser may be disposed around all or part of the writing tip at least when the eraser is in the retracted position. The writing tip may comprise a writing end. When the ink writing instrument is seen perpendicular to the axis, the writing end may be concealed by the eraser when the eraser is in the protruded position and the writing end may be free from the eraser when the eraser is in the retracted position.

The writing end is the portion of the writing tip which is applied on a substrate or surface for writing.

The eraser may have at least a portion forming a sleeve around the writing tip and sliding along the axis in order to free the writing end for writing (i.e. in the retracted position) or to concealed the writing end for its protection when not used (in the protruded position). The eraser may have a (first) cylindrical portion extending along the axis. The cylindrical portion of the eraser may have an axial length greater than or equal to the axial length of the portion of the writing tip which protrudes axially out of the body.

In embodiments, the eraser may have a distal end, and the distal end may have a frustoconical shape.

In embodiments, the body may comprise a first part and a second part rotatable around the axis with regard to the first part and axially coupled with the first part, the second part being provided with the helical cam or the two cam followers.

If the second part is provided with the helical cam, the eraser may be provided with the two cam followers. If the second part is provided with the two cam followers, the eraser may be provided with the helical cam.

The relative rotation of the first part with regard to the second part may actuate the helical-cam propelling mechanism, due to which the eraser may be moved between the retracted position and the protruded position.

In embodiments, the first part may be coupled with the second part. The first part may be removably or un-removably coupled with the second part.

In embodiments, the second part may comprise a first portion rotatably mounted with the first part and a second portion rotatably coupled with the first portion, and the first portion may be provided with one of the two cam followers and the second portion may be provided with the other of the two cam followers.

In such a case, the eraser may be provided with the helical cam.

In embodiments, the eraser may be rotatably coupled with the first part, axially slidable with regard to the first part, axially coupled with the second part and rotatable with regard to the second part In other words, when the first part and the second part rotate with regard to each other, the eraser may axially slide with regard to the first part and may rotatably slide with regard to the second part. When the first part and the second part rotate with regard to each other, the first part may axially drive the eraser with regard to the body.

In embodiments, the first portion may be fixed (e.g. snap-fitted, glued or press-fitted) with the second portion. The first portion may be removably or un-removably fixed with the second portion.

In embodiments, the first end may be provided with a protection which is distinct from the eraser and is movable along the axis with regard to the body between a retracted position and a protruded position, and the protection is configured to protect the writing tip in the protruded position The protection may only have a function of protecting the writing tip in the protruded position, e.g. from contact/interaction with an external environment. In other words, the protection may not be used for anything else than protecting the writing tip. For example, it may not be used for erasing, such a function being dedicated to the eraser. For example, with such a protection, the eraser may be used only for erasing, which may improve the durability of the eraser. The protection may also be configured to protect the eraser.

In the protruded position the protection may be able to protect the writing tip while the writing tip may be not able to be used for writing. In the retracted position the protection may be not able to protect the writing tip while the writing tip may be able to be used for writing.

It is noted that the presence of both the eraser and the protection may be considered independently of the structure on the helical-cam propelling mechanism according to the present disclosure. In other words, embodiments may have the eraser movable along the axis between a retracted position and a protruded position and the protection movable along the axis between a retracted position and a protruded position, with any propelling mechanism(s) configured to move the eraser and/or the protection. For example, such a writing instrument may comprise a single propelling mechanism configured to move the eraser and the protection. The single propelling mechanism may be a helical-cam cam propelling mechanism, but not necessarily.

In embodiments, the helical-cam propelling mechanism may be configured to move the protection along the axis between the retracted position and the protruded position.

In other words, the helical-cam propelling mechanism may be configured to move the eraser between its retracted position and its protruded position and the protection between its retracted position and its protruded position. The helical-cam propelling mechanism may move the eraser and the protection simultaneously, sequentially, or independently from each other.

In embodiments, the helical-cam propelling mechanism may comprise a second helical cam, the second helical cam (or second helical cam portion) radially protrudes from one of the protection and the body.

In embodiments, two cam followers may axially sandwich the second helical cam at least when the protection is moved between the retracted position and the protruded position.

For example, the second helical cam may be formed on the protection. In such a case the second helical cam may protrude radially outward. In another example, the second helical cam may be formed on the body. In such a case the second helical cam may protrude radially inward.

The helical-cam propelling mechanism may comprise only two cam followers (e.g. a single pair of cam followers being configured to cooperate with both the helical cam and the second helical cam), or two pairs of cam followers (e.g. each pair of cam follower may be configured to cooperate with a single helical cam, one with the helical cam the other with the second helical cam).

If the second helical cam is formed on the protection, the two cam followers configured to cooperate with the second helical cam may be formed on the body. For example the two cam followers may protrude radially inward. If the second helical cam is formed on the body, the two cam followers configured to cooperate with the second helical cam may be formed on the protection. For example the cam followers may protrude radially inward.

For example, the second helical cam may be formed on the same element provided with the helical cam. For example, the helical cam and the second helical cam may circumferentially extend in the continuity of each other. For example, the helical cam may be formed on the eraser and the second helical cam may be formed on the protection, the helical cam and the second helical cam may circumferentially extend in the continuity of each other when both the eraser and the protection are in the retracted position.

For example, the helical cam may be formed on the eraser and the second helical cam may be formed on the protection, and the body may comprise only two cam followers (i.e. a single pair of cam followers). For example the two cam followers may axially sandwich the helical cam only when moving the eraser between the retracted position and the protruded position and may axially sandwich the second helical cam only when moving the protection between the retracted position and the protruded position. For example, the two cam followers may be configured to sandwich the helical cam and/or the second helical cam and axially held the eraser and/or the protection, respectively, in the protruded position. For example, the two cam followers and/or a stopper may be configured to sandwich the helical cam and the second helical cam at the same time and to axially hold both the eraser and the protection, when both the eraser and the protection are in their respective retracted position. In other words, when the cam followers cooperates with the helical cam/second helical cam in order to drive the eraser/protection between the retracted position and the protruded position, the cam followers may not cooperate with the second helical cam/helical cam, respectively, so that the protection/eraser, respectively, may rest in the retracted position.

In another example, both the helical cam and the second helical cam may be formed on the body, the eraser may comprise the pair of cam followers (or first pair of cam followers—which may be configured to cooperate with the helical cam) and the protection may comprise a second pair of cam followers (which may be configured to cooperate with the second helical cam). For example the first pair of cam followers may axially sandwich the helical cam only when moving the eraser between the retracted position and the protruded position and the second pair of cam followers may axially sandwich the second helical cam only when moving the protection between the retracted position and the protruded position. For example, the first/second pair of cam followers may be configured to sandwich the helical cam/second helical cam, respectively, and axially held the eraser/protection, respectively, in the protruded position. For example, the first/second pair of cam followers may be configured to sandwich the helical cam/second helical cam, respectively, and axially held the eraser/protection, respectively, at the same time, when both the eraser and the protection are in their respective retracted position. In other words, when the first pair of cam followers cooperates with the helical cam in order to drive the eraser between the retracted position and the protruded position, the second pair of cam followers may not cooperate with the second helical cam and the protection may rest in the retracted position. In the same way, when the second pair of cam followers cooperates with the second helical cam in order to drive the protection between the retracted position and the protruded position, the first pair of cam followers may not cooperate with the helical cam and the eraser may rest in the retracted position.

In embodiments, the helical-cam propelling mechanism may be configured to move only one of the eraser and the protection at a time.

In embodiments, the other of the eraser and the protection may rest in the retracted position when the one of the eraser and the protection is moved by the helical-cam propelling mechanism.

In embodiment, only one of the eraser and the protection at time may be in the protection position at time.

In embodiments, the helical-cam propelling mechanism may comprise a stopper configured to axially block one of the eraser and the protection (for example in the retracted position) when the other of the eraser and the protection is moved between the retracted position and the protruded position.

The stopper may comprise a radial projection configured to be engaged with an annular groove or annular groove portion. For example, the body may comprise a projection projecting radially inward, the projection being configured to be engaged with a first annular groove portion of the protection when the eraser is moved between the retracted position and the protruded position and to be engaged with a second annular groove portion of the eraser when the protection is moved between the retracted position and the protruded position.

In embodiments, the protection and the eraser may be at least in part coaxial.

In embodiments, all or part of the protection may be disposed around all or part of the eraser at least when the protection is in the retracted position. When the ink writing instrument is seen perpendicular to the axis, the writing end may be concealed by the protection when the protection is in the protruded position and the writing end may be free from the protection when the protection is in the retracted position.

The protection may have at least a portion forming a sleeve around the eraser and the writing tip and sliding along the axis in order to free the writing end for writing (i.e. in the retracted position) or to concealed the writing end for its protection when not used (in the protruded position). The protection may have a (second) cylindrical portion extending along the axis. The cylindrical portion of the protection may have an axial length greater than or equal to the axial length of the portion of the writing tip which protrudes axially out of the body.

In embodiments, the eraser may comprise a first cylindrical portion extending along the axis and the protection may comprise a second cylindrical portion extending along the axis.

In embodiments, the second cylindrical portion may be disposed around all or part of the first cylindrical portion at least when the protection is in the retracted position.

The second cylindrical portion may be configured to receive the first cylindrical portion, at least when both the eraser and the protection are in the retracted position. In other words, the first cylindrical portion may have a first diameter and the second cylindrical portion may have a second diameter, the second diameter being greater than the first diameter.

In embodiments, the eraser may comprise a first half-cylindrical portion extending along the axis, the protection may comprise a second half-cylindrical portion extending along the axis, the first half cylindrical portion and the second half cylindrical portion forming a cylindrical casing configured to receive a writing body having the writing end and being configured to slide relatively to each other along the axis when the eraser or the protection is moved between the retracted position and the protruded position.

In embodiments, the writing instrument may comprise a writing body having the writing tip, the writing body being coupled with the second end.

The writing body may directly or un-directly coupled with the second end.

In embodiments, the first end may be provided with a protective cover fixed with regard to the body.

In embodiments, the protective cover may have at least one cut. The protective cover may be configured to be elastically deformed from a rest configuration to a deformed configuration to allow the passage of the eraser (or the protection, if any) through the at least one cut when the eraser (or the protection, if any) is moved from the retracted position to the protruded position and to return to a rest configuration when the eraser (or the protection, if any) is moved from the protruded position to the retracted position.

In embodiments, the first part may be provided with the second end and the second part may be provided with the first end.

In embodiments, the ink may be an erasable ink.

In embodiments, the eraser may be configured to erase the erasable ink.

In embodiments, the erasable ink may be a peelable ink or a thermochromic ink and the eraser may be a peeling body or a friction body, respectively.

A peelable ink is an ink that forms a removable layer on the substrate or surface onto with it is applied. A peeling body is configured to remove or peel a layer of peelable ink.

The peeling body may be made of rubber (synthetic or natural), foam, felt, cloth, sponge, gum, silicone, etc.

A thermochromic ink is an ink that may change color as a function of the heat to which it is subjected. A friction body is a body configured to be rubbed over a surface, for example in order to generate heat and to cause a thermochromic ink to change color. The friction body may be made of rubber or elastomer. For example, it may be made of SEBS (styrene-ethylene-butylene-styrene copolymer), SBS (styrene-butadiene-styrene copolymer), EPDM (ethylene-propylene-diene monomer), cork or any other rubber or elastomer having a high coefficient of friction.

Such ink writing instruments may form a user friendly writing instruments wherein the eraser is prevented from being touched by the user while the writing tip may be easily protected when not used.

BRIEF DESCRIPTION OF THE DRAWINGS

The disclosure and its advantages can be better understood by reading the detailed description of various embodiments given as non-limiting examples. The description refers to the accompanying sheets of figures, in which.

DETAILED DESCRIPTION

Figure 1:
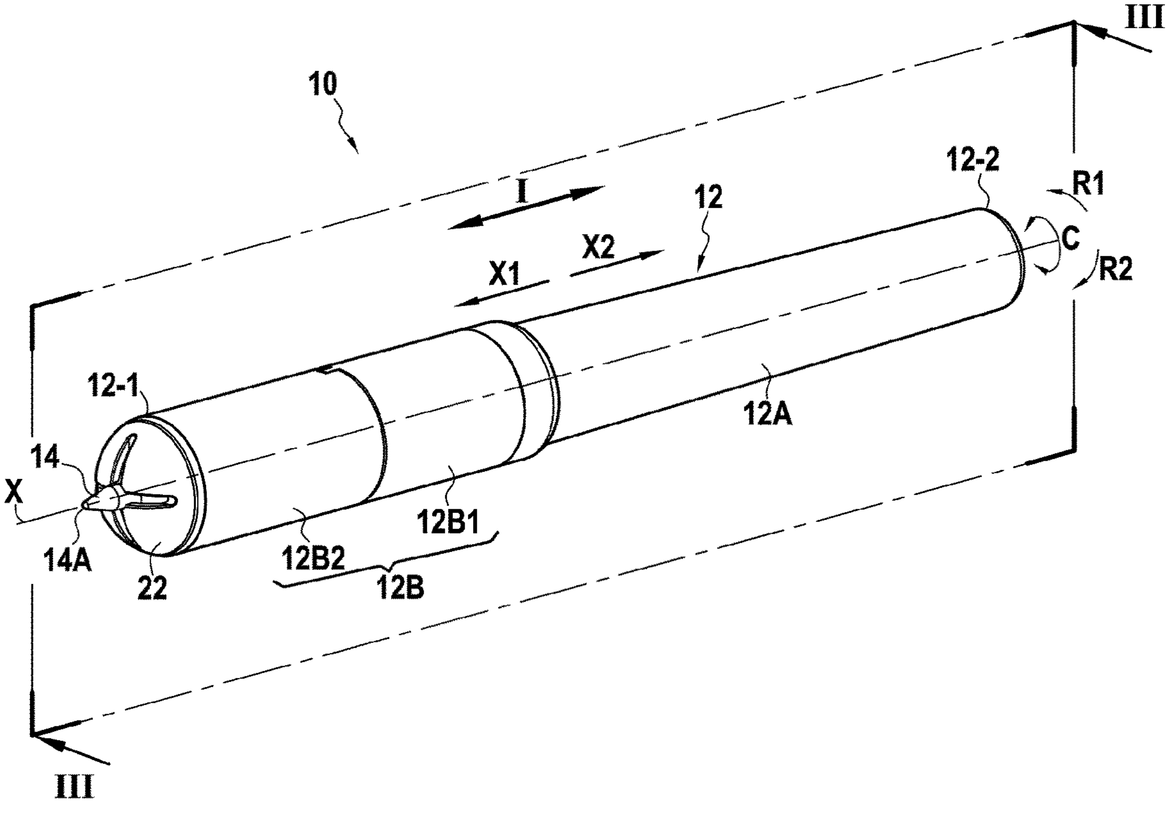
FIG. 1 shows an ink writing instrument according to a first embodiment.
Figure 2:
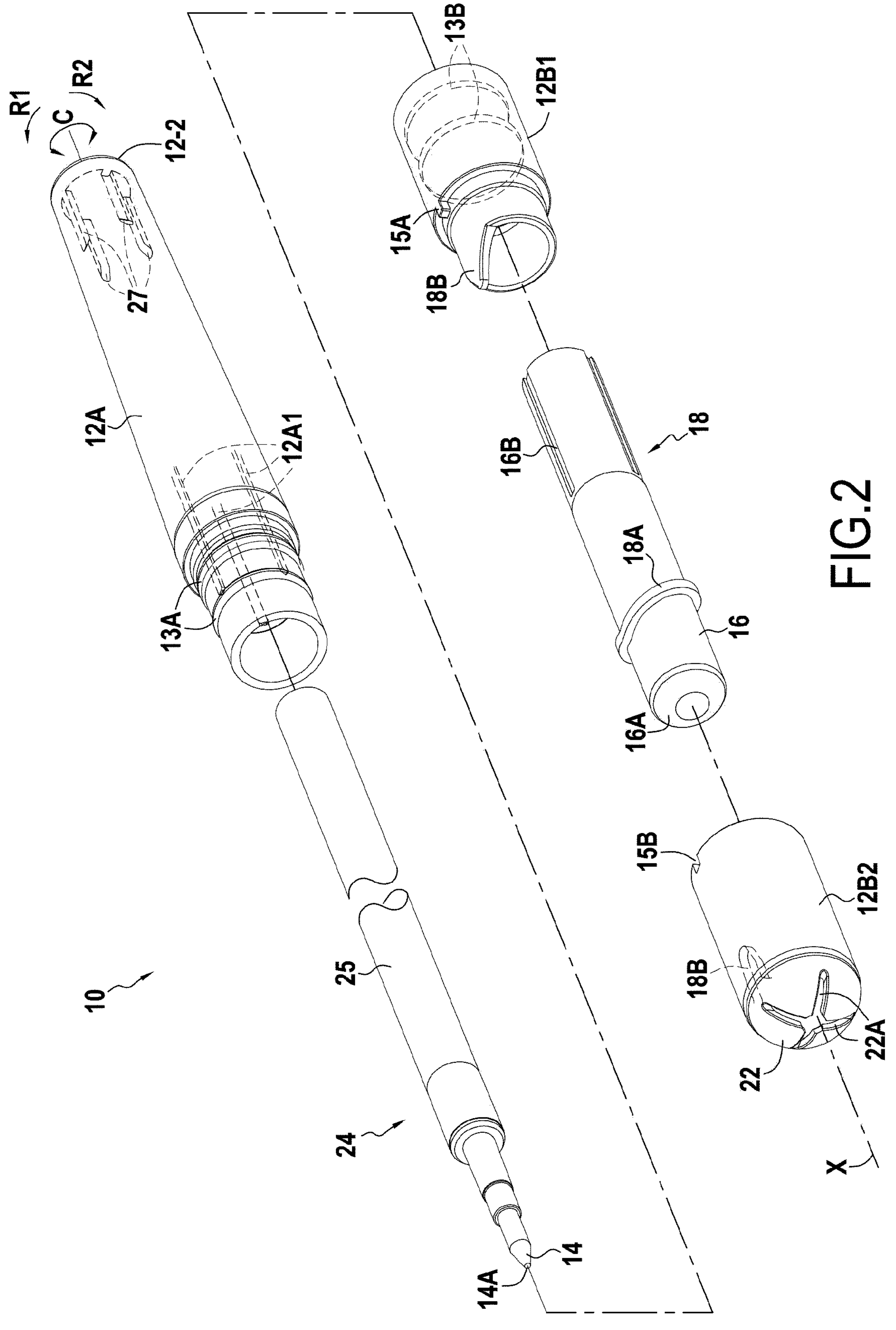
FIG. 2 shows an exploded view of the ink writing instrument of FIG. 1.
Figure 3:
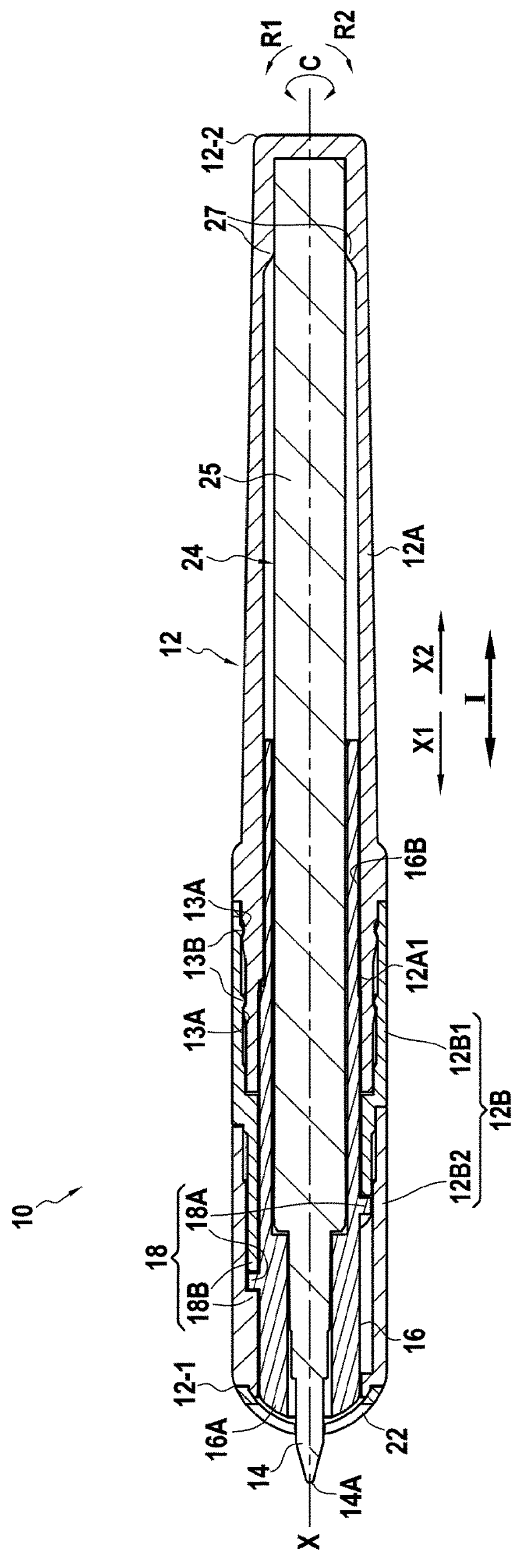
FIG. 3 shows a sectional view of the ink writing instrument of FIG. 1, in the plane III of FIG. 1.

FIGS. 1, 2 and 3 show an ink writing instrument 10 according to a first embodiment. The writing instrument 10 comprises a body 12 extending along an axis X. The body 12 has a first end (or front end) 12-1 and a second end (or rear end) 12-2 opposed to the first end 12-1 along the axis X. The first end 12-1 is provided with a writing tip 14 and with an eraser 16. The writing tip 14 is fed with ink. The ink may be erasable (e.g. thermochromic or peelable ink). The eraser 16 may be configured to erase the erasable ink. The writing tip 14 is fixed with regard to the body 12. The eraser 16 is movable along the axis X with regard to the body 12 (see double-arrow I in FIG. 1). The ink writing instrument 10 further comprises a helical-cam propelling mechanism 18 (see FIGS. 2 and 3) configured to move the eraser 16 along the axis X between a retracted position (see FIGS. 1, 3 and 4) and a protruded position (see FIG. 6). The helical cam propelling mechanism 18 may comprise a helical cam 18A radially protruding from the eraser 16, and two cam followers 18B arranged on the body 12. In this example, the two cam followers 18B may constantly axially sandwich the helical cam 18A. The helical cam 18A may protrude radially outward and the two cam followers 18B may radially protrude radially inward. The helical cam 18A may be formed on an outer annular face of the eraser 16. Each cam follower 18B may be formed on an inner annular face of the body 12. Each cam follower 18B may have a tooth shape. The two cam followers 18B may be axially oriented upside down (or axially facing each other). The two cam followers 18B may be disposed at the same position along the circumferential direction C.

In the present example, the helical cam 18B may be continuous along the circumferential direction C around the axis X, and may have an axisymmetric shape. For example, when seen perpendicular to the axis X, the helical cam 18B may form an angle at the two opposite axial extreme points in order to provide an indication to the user that the retracted or the protruded position has been reached.

The eraser 16 and the writing tip 14 may be coaxial. The eraser 16 may be disposed around the writing tip 14. The eraser 16 may form a sleeve extending along the axis X and configured to receive therein all or part of the writing tip 14. The writing tip 14 may comprise a writing end 14A. When the writing instrument 10 is seen perpendicular to the axis X as in FIGS. 4 to 6, the writing end 14A may be concealed by the eraser 16 when the eraser 16 is in the protruded position (see FIG. 6) and the writing end 14A may be free from the eraser 16 when the eraser 16 is in the retracted position (see FIG. 4). When the writing instrument 10 is seen perpendicular to the axis X, the writing end 14A may be free from the eraser 16 when the eraser 16 is in an intermediate position between the protruded position and the retracted position (see FIG. 5). The eraser 16 may have a distal end 16A. The distal end 16A may have a frustoconical shape. This may render the writing easier when the eraser 16 is in the intermediate position.

The body 12 may comprise a first part 12A and a second part 12B. The second part 12B may be rotatable around the axis X with regard to the first part 12A and may be axially coupled with the first part 12A. The second part 12B may be provided with the two cam followers 18B. The first part 12A may be snap-fitted with the second part 12B. For example, the first part 12A may comprise two annular ribs 13A configured to be engaged with two complementary annular ribs 13B of the second part 12B. Such a snap-fitting may axially couple the first and the second part 12A and 12B while being free to rotate relatively to each other around the axis X.

The second part 12B may comprise a first portion 12B1 rotatably mounted with the first part 12A and a second portion 12B2 rotatably coupled with the first portion 12B1. The first portion 12B1 may be provided with one of the two cam followers 18B and the second portion 12B2 may be provided with the other of the two cam followers 18B. The annular ribs 13B may be provided on the first portion 12B1. The first portion 12B1 may be fixed (e.g. press-fitted or snap fitted) with the second portion 12B2 in order to axially couple the two portions 12B1 and 12B2. For example, the first portion 12B1 may comprise an axial projection 15A configured to be engaged within an axial recess 15B of the second portion 12B1 in order to rotatably couple the first portion 12B1 and the second portion 12B2.

The eraser 16 may be rotatably coupled with the first part 12A and axially slidable with regard to the first part 12A. For example, the eraser 16 may comprise axial grooves 16B slidably engaged with axial ribs 12A1 of the body 12. In this example, the first part 12A may be provided with the ribs 12A1. The eraser 16 may be axially coupled with the second part 12B and rotatable with regard to the second part 12B. This may be done via the helical-cam propelling mechanism 18.

In the present example, the writing instrument 10 may comprise a writing body 24, for example a cartridge, which may comprise the writing tip 14. The writing body 24 may also comprise an ink reservoir 25 configured to store erasable ink, for example thermochromic ink. The writing tip 14 may be fed with erasable ink by the reservoir 25. The eraser 16 may comprise a friction body.

The writing body 24 may be coupled with the second end 12-2. For example, the rear end of the reservoir 25 may by press-fitted with radial ribs 27 disposed on the second end 12-2, into the body 12.

In the present example, the first end 12-1 may be provided with a protective cover 22 fixed with regard to the body 12. The protective cover 22 may have two perpendicular diametric cuts 22A. The protective cover 22 may be configured to be elastically deformed from a rest configuration (see FIG. 1) to a deformed configuration (see FIGS. 4 and 6) to allow the passage of the eraser 16 through the cuts 22A when the eraser 16 is moved from the retracted position to the protruded position and to return to a rest configuration when the eraser 16 is moved from the protruded position to the retracted position. The writing tip 14 may always axially protrude through the cover 22. The cover 22 may be configured for being not deformed by the writing tip 14.

In this example, when the eraser 16 is in the retracted position (see FIG. 4), the second part 12B of the body 12 may be rotated relatively to the first part 12A in the first rotational direction R1 (see FIGS. 5 and 6) or in the second rotational direction R2 (not shown) around the axis X shown in FIG. 1. The two cam followers 18B may rotate together with the second part 12B and drive axially the eraser 16 via the helical cam 18A in the first axial direction X1, then pushing the eraser 16 in the first axial direction X1. The eraser 16 may be thus moved from the retracted position (see FIG. 4) toward the intermediate and the protruded position (see FIGS. 5 and 6, respectively). Similarly, when the eraser 16 is in the protruded position (see FIG. 6), the second part 12B of the body 12 may be rotated relatively to the first part 12A in the first rotational direction R1 or in the second rotational direction R2 around the axis X shown in FIG. 1. The two cam followers 18B may rotate together with the second part 12B and drive axially the eraser 16 via the helical cam 18A in the second axial direction X2, opposite to the first axial direction X1, then pushing the eraser 16 in the second axial direction X2. The eraser 16 may be thus moved from the protruded position (see FIG. 6) toward the intermediate and the retracted position (see FIGS. 5 and 4).

No button may be needed in order to actuate the eraser 16. The writing instrument 10 may thus be a buttonless writing instrument. The structure of such a writing instrument may be simple and provide better ergonomics on the body.

Figure 4:
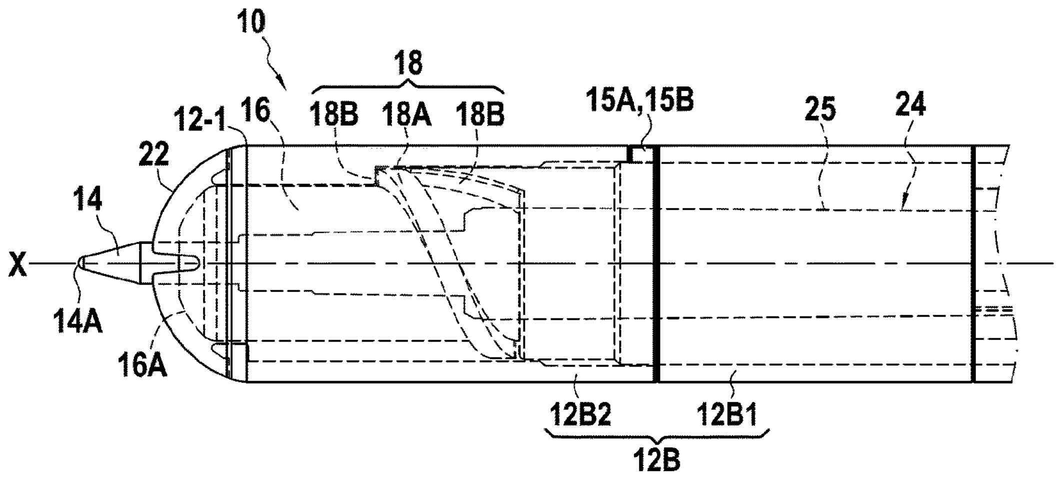
FIG. 4 shows the ink writing instrument of FIG. 1 seen perpendicular to the axis X, the eraser being in the retracted position.
Figure 5:
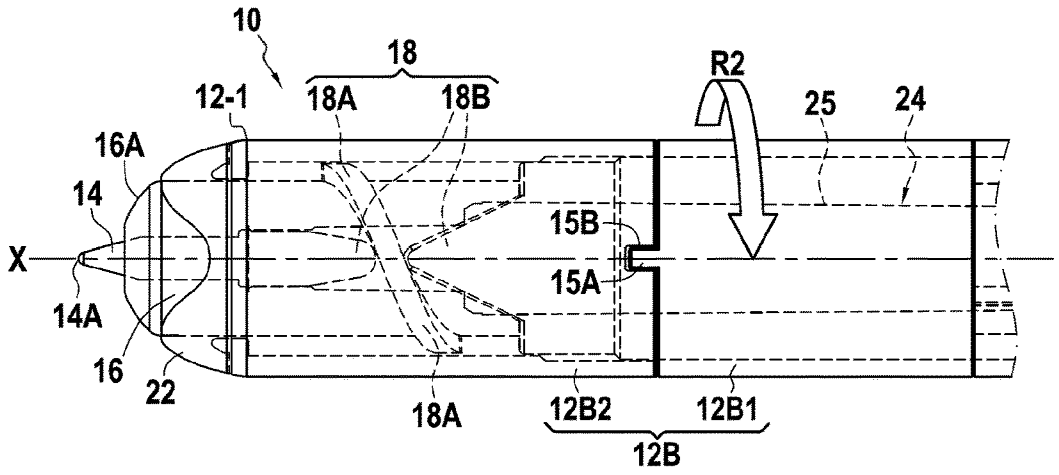
FIG. 5 shows the ink writing instrument of FIG. 1 seen perpendicular to the axis X, the eraser being in an intermediate position between the retracted position and the protruded position.
Figure 6:
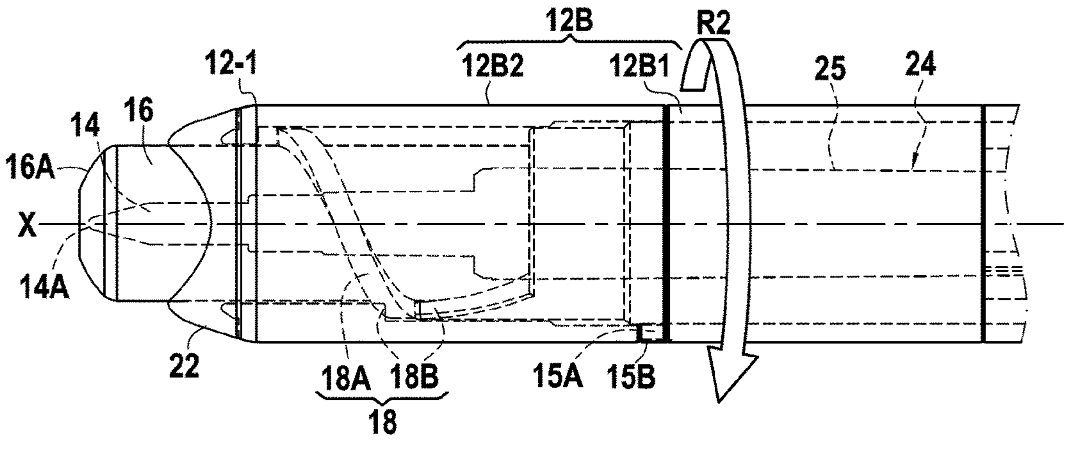
FIG. 6 shows the ink writing instrument of FIG. 1 seen perpendicular to the axis X, the eraser being in the protruded position.

As shown in FIGS. 4 to 6, the writing tip 14 is fixed with regard to the body 12 while the eraser 16 is movable between a retracted position (see FIG. 4) and a protruded position (see FIG. 6). When the eraser 16 is in the retracted position (see FIG. 4) or in the intermediate position (see FIG. 5) the eraser 16 may not be used and the writing tip 14 may be used for writing. When the eraser 16 is in the protruded position (see FIG. 6), the writing tip 14 is protected by the eraser 16 and may not be used and the eraser 16 may be used for erasing an erasable ink applied with the writing tip 14.

Figure 7:
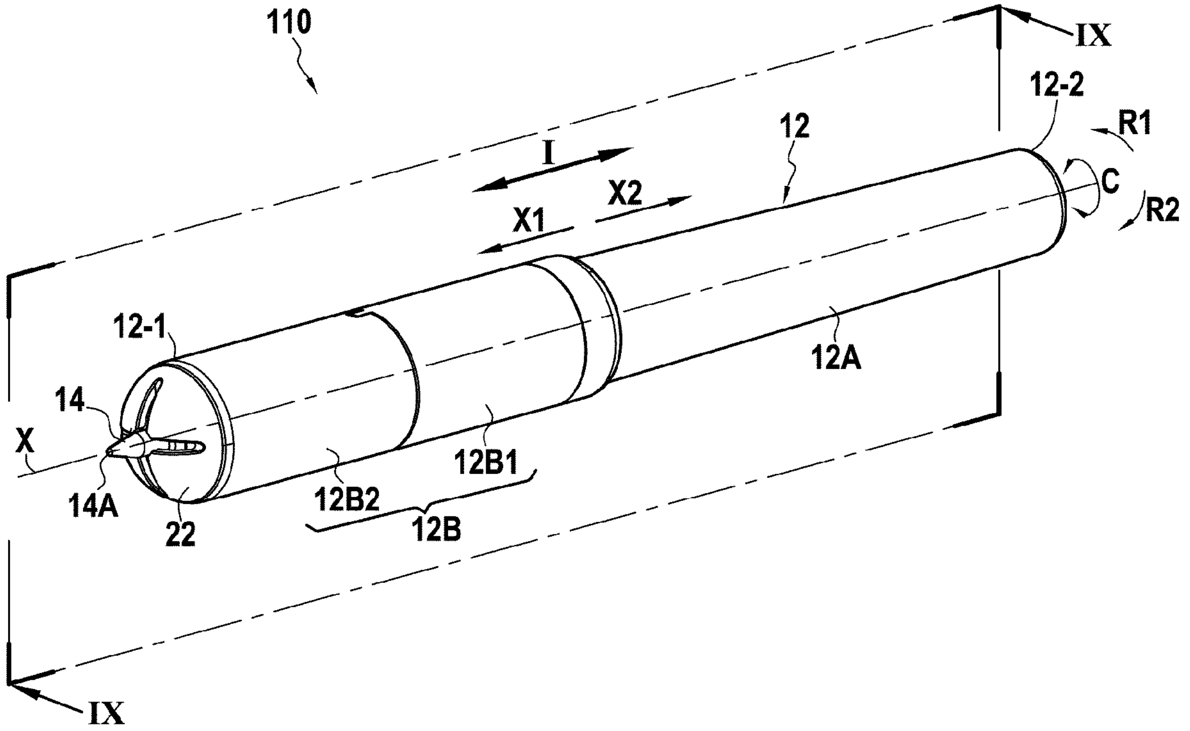
FIG. 7 shows an ink writing instrument according to a second embodiment.
Figure 8:
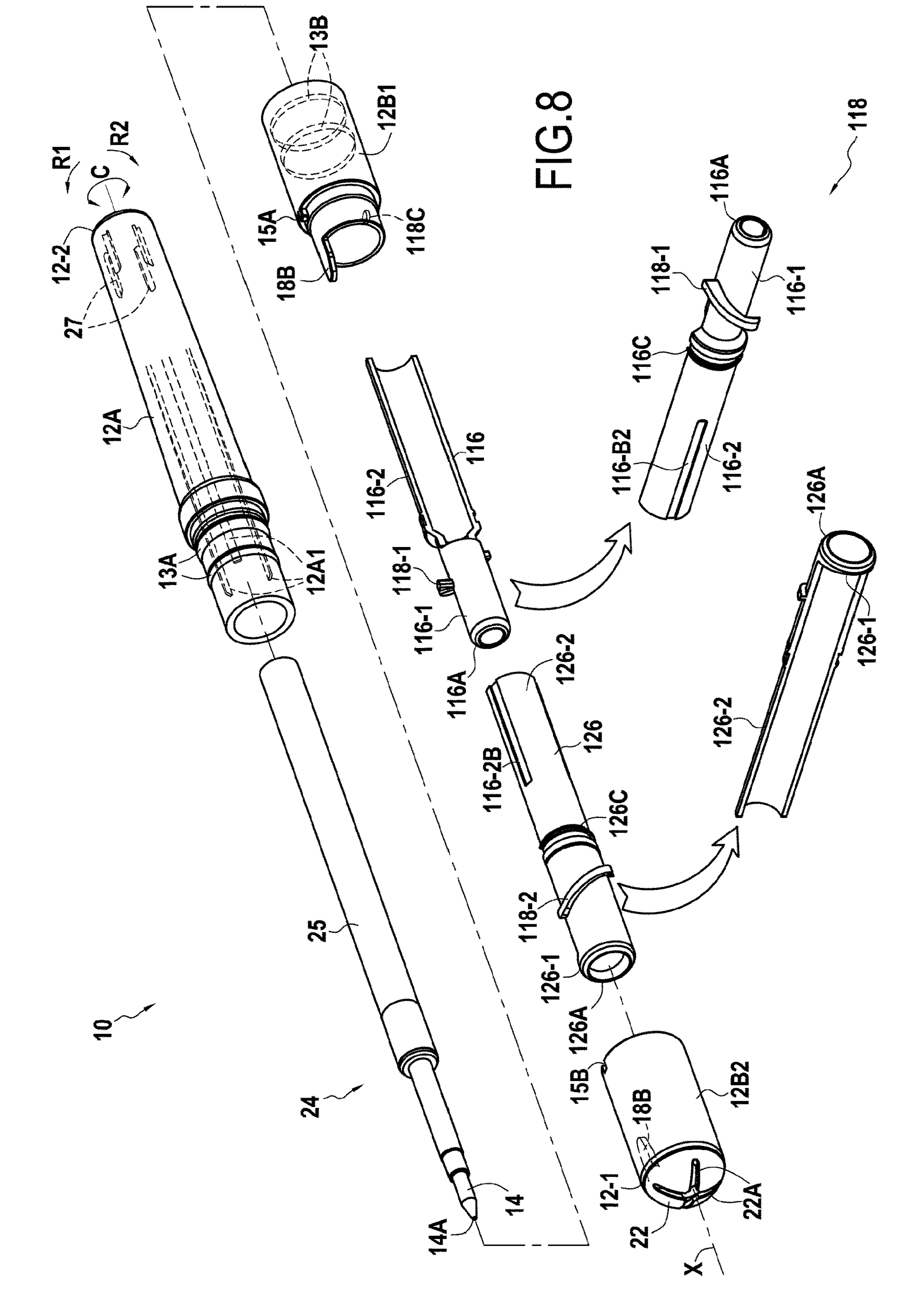
FIG. 8 shows an exploded view of the erasable ink writing instrument of FIG. 7.
Figure 9:
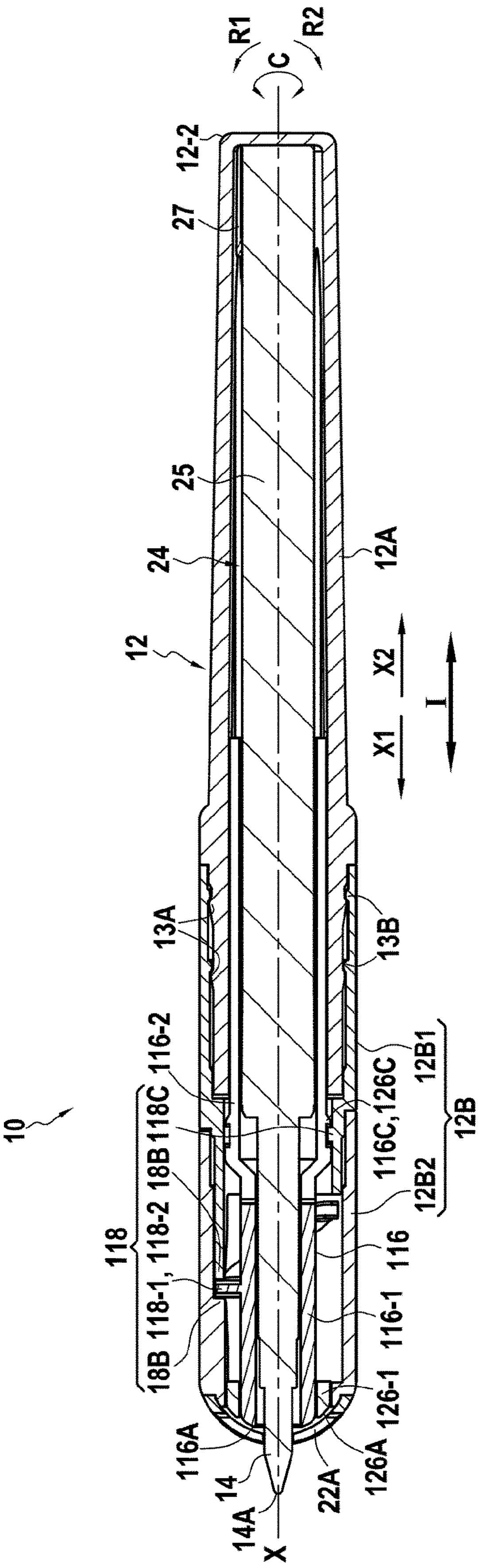
FIG. 9 shows a sectional view of the ink writing instrument of FIG. 7, in the plane IX of FIG. 7.

FIGS. 7, 8 and 9 show an ink writing instrument 110 according to a second embodiment. The writing instrument 110 of the second embodiment is similar to the writing instrument 10 of the first embodiment, except the eraser 116 which is different from the eraser 16 and the presence of a protection 126. The elements/parts which are identical between the first embodiment and the second embodiment have the same reference signs, the other elements/parts having their reference sign increased by 100. As the eraser 16, the eraser 116 is movable along the axis X with regard to the body 12 between the retracted position and the protruded position by the helical cam mechanism 118.

The writing instrument 110 comprises a protection 126 which is distinct from the eraser 116. The protection 126 is movable along the axis X with regard to the body 12 between a retracted position and a protruded position. The protection 126 is configured to protect the writing tip 14 in the protruded position. The protection 126 may only have a function of protecting the writing tip 14 in the protruded position. The helical-cam propelling mechanism 118 may be configured to move the eraser 116 between its retracted position and its protruded position and to move the protection 126 between its retracted position and its protruded position. The helical-cam propelling mechanism 118 may be configured to move only one of the eraser 116 and the protection 126 at time. The other of the eraser 116 and the protection 126 may rest in the retracted position when the one of the eraser 116 and the protection 126 is moved by the helical-cam propelling mechanism 118.

The helical-cam propelling mechanism 118 may comprise a first helical cam 118-1 (which correspond, from the function point of view, to the helical cam 18A of the first embodiment) and a second helical cam 118-2. The first helical cam 118-1 may radially protrude outward from the eraser 116. The second helical cam 118-2 may radially protrude outward from the protection 126. The first helical cam 118-1 and the second helical cam 118-2 may circumferentially extend in the continuity of each other when both the eraser 116 and the protection 118 are in the retracted position. In the present example, each of the first and the second helical cam 118-1, 118-2 may structurally correspond to a half of the helical cam 18A of the first embodiment, such a half axially extending between the two extreme axial points of the helical cam 18A.

In this example, the helical-cam propelling mechanism 118 may comprise only two cam followers, e.g. the two cam followers 18B. The two cam followers 18B may axially sandwich the first helical cam 118-1 when the eraser 116 is moved between its retracted position and its protruded position and may axially sandwich the second helical cam 118-2 when the protection 126 is moved between its retracted position and its protruded position. The two cam followers 18B may be configured to axially sandwich both the first helical cam 118-1 and the second helical cam 118-2 when both the eraser 116 and the protection 126 are in the retracted position.

In this example, the helical-cam propelling mechanism 118 may comprise a stopper 118C configured to axially block one of the eraser 116 and the protection 126 in the retracted position when the other of the eraser 116 and the protection 126 is moved between the retracted position and the protruded position. In this example, the stopper may comprise a radial projection 118C configured to be engaged with an annular groove portion 116C of the eraser 116 and/or with an annular groove portion 126C of the protection 126. The radial projection 118C may be radially project inward from the first portion 12B1 (the projection 118C being not present in the first portion 12B1 of the first embodiment, the rest of the first portion 12B1 being identical between the first and the second embodiments). The radial projection 118C may be disposed diametrically opposed to the cam follower 18B of the first portion 12B1. The radial projection 118C may be configured to be engaged in both the annular groove portion 116C of the eraser 116 and the annular groove portion 126C of the protection 126 when both the eraser 116 and the protection 126 are in the retracted position.

In the present example, the eraser 116 may comprise a first cylindrical portion 116-1 and a first half-cylindrical portion 116-2, both extending along the axis X. The first cylindrical portion 116-1 and the first half-cylindrical portion 116-2 may be integrally formed, the first cylindrical portion 116-1 being disposed on the side of the first end 12-1 while the first half-cylindrical portion 116-2 is disposed on the side of the second end 12-2. The first cylindrical portion 116-1 may comprise the distal end 116A of the eraser 116, which may have a frustoconical shape, and the first helical cam 118-1. The first half-cylindrical portion 116-2 may comprise the annular groove portion 116C. The protection 126 may comprise a second cylindrical portion 126-1 and a second half-cylindrical portion 126-2, both extending along the axis X. The second cylindrical portion 126-1 and the second half-cylindrical portion 126-2 may be integrally formed, the second cylindrical portion 126-1 being disposed on the side of the first end 12-1 while the second half-cylindrical portion 126-2 is disposed on the side of the second end 12-2. The second cylindrical portion 126-1 may comprise the distal end 126A of the protection 126, which may have any shape. The second half-cylindrical portion 126-2 may comprise the second helical cam 118-2 and the annular groove portion 126C.

The first half cylindrical portion 116-2 and the second half cylindrical portion 126-2 may form together a cylindrical casing configured to receive the writing body 24 and may be configured to slide relatively to each other along the axis X when the eraser 116 or the protection 126 is moved between the retracted position and the protruded position. Each half-cylindrical portion 116-2, 126-2 may have at least one axial groove 116-2B, 126-2B, each axial groove 116-2B, 126-2B may be configured to be slidably engaged with an axial rib 12A1 of the first part 12A, in order to be rotatably coupled and axially slidable with regard the first part 12A.

The second cylindrical portion 126-1 of the protection 126 may have an axial length greater than or equal to the axial length of the portion of the writing tip 14 which protrudes axially out of the body 12. The axial stroke of the protection 126 may be equal to or greater than the expose length of the writing tip 14.

The protection 126 and the eraser 116 may be at least in part coaxial. The second cylindrical part 126-1 may be disposed around the first cylindrical part 116-1 of the eraser 116 when the protection 126 and the eraser 116 are in the retracted position. When the ink writing instrument 110 is seen perpendicular to the axis X, the writing end 14A may be concealed by the protection 126 when the protection 126 is in the protruded position and the writing end 14A may be free from the protection 126 when the protection 126 is in the retracted position. In the present example, when the ink writing instrument 110 is seen perpendicular to the axis X, the writing end 14A may be concealed by the eraser 116 or by the protection 126 the when the eraser 116 or the protection 116 is in the protruded position and the writing end 14A may be free from the eraser 116 or the protection 126 when the eraser or the protection 116 is in the retracted position, respectively. In the present example, only one of the eraser 116 and the protection 126 may be in the protruded position at time.

Figure 10:
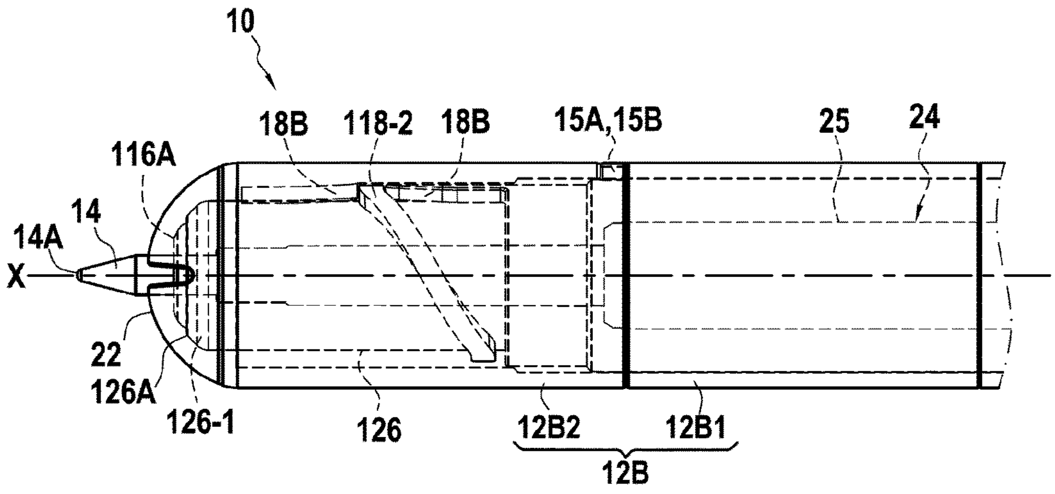
FIG. 10 shows the ink writing instrument of FIG. 7 seen perpendicular to the axis X, both the eraser and the protection being in the retracted position.

When both the eraser 116 and the protection 126 are in the retracted position, the stopper 118C may be engaged in both the annular groove portion 116C of the eraser 116 and the annular groove portion 126C of the protection 126 while the cam followers 18B may cooperate with both the first helical cam 118-1 and the second helical cam 118-2 (see FIG. 10). The second part 12B of the body 12 may be rotated relatively to the first part 12A in the first rotational direction R1 or in the second rotational direction R2 around the axis X shown in FIG. 1.

When both the eraser 116 and the protection 126 are in the retracted position, if the second part 12B is rotated relatively to the first part 12A in the first rotational direction R1, the cam followers 18B are engaged only with the first helical cam 118-1 while the stopper 118C is engaged only with the annular groove portion 126C of the protection 126. Therefore, the eraser 116 is moved from the retracted position toward the protruded position in the first axial direction X1 by the cam followers 18B while the protection 126 is blocked in the retracted position by the stopper 118C (see FIG. 11, the protection 126 being partially shown for clarity). Of course, the eraser 116 may be driven to an intermediate position (similar to FIG. 5 of the first embodiment), or to the projecting position (see FIG. 11). When the eraser 116 is in the projecting position, the cam follower 18B of the first portion 12B1 may circumferentially abut against a free end of the second helical cam 118-2 which limits the angular stroke of the relative rotation between the first part 12A and the second part 12B in the first rotational direction R1. The second part 12B has to be rotated relatively to the first part 12A in the second rotational direction R2 to drive the eraser 116 from the protruded position (see FIG. 11) or an intermediate position, toward the retracted position (see FIG. 10).

When both the eraser 116 and the protection 126 are in the retracted position, if the second part 12B is rotated relatively to the first part 12A in the second rotational direction R2, the cam followers 18B are engaged only with the second helical cam 118-2 while the stopper 118C is engaged only with the annular groove portion 116C of the eraser 116. Therefore, the protection 126 is moved from the retracted position toward the protruded position along the first axial direction X1 by the cam followers 18B while the eraser 116 is blocked in the retracted position by the stopper 118C (see FIG. 12, the eraser 116 being partially shown for clarity). Of course, the protection 126 may be driven to an intermediate position (similar to FIG. 5 of the first embodiment), or to the projecting position (see FIG. 12). When the protection 126 is in the projecting position, the cam follower 18B of the first portion 12B1 may circumferentially abut against a free end of the first helical cam 118-1 which limits the angular stroke of the relative rotation between the first part 12A and the second part 12B in the second rotational direction R2. The second part 12B has to be rotated relatively to the first part 12A in the first rotational direction R1 to drive the protection 126 from the protruded position (see FIG. 12) or an intermediate position toward the retracted position (see FIG. 10).

No button may be needed in order to actuate the eraser 116 and the protection 126. The writing instrument 110 may thus be a buttonless writing instrument. The structure of such a writing instrument may be simple and provide better ergonomics on the body.

Figure 11:
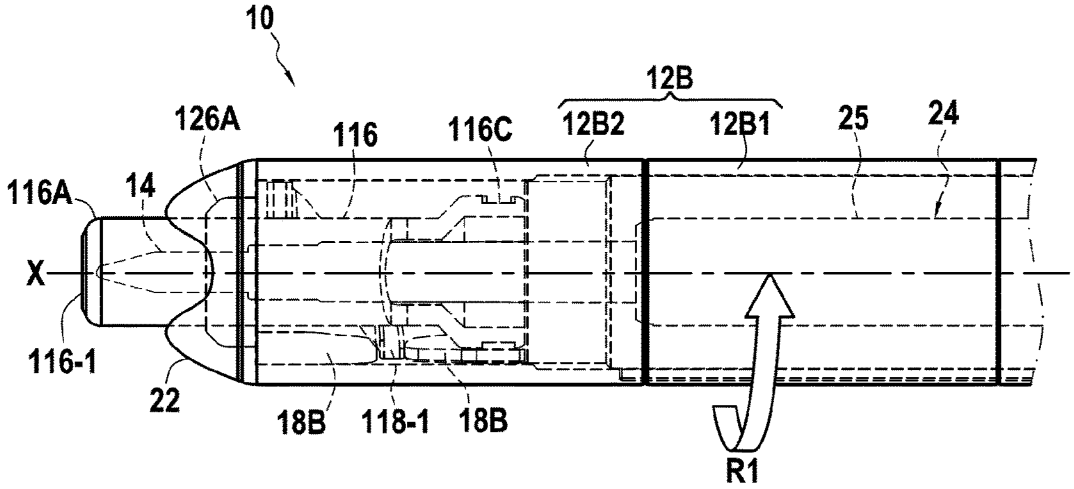
FIG. 11 shows the ink writing instrument of FIG. 7 seen perpendicular to the axis X, the eraser being in the protruded position while the protection is in the retracted position.
Figure 12:
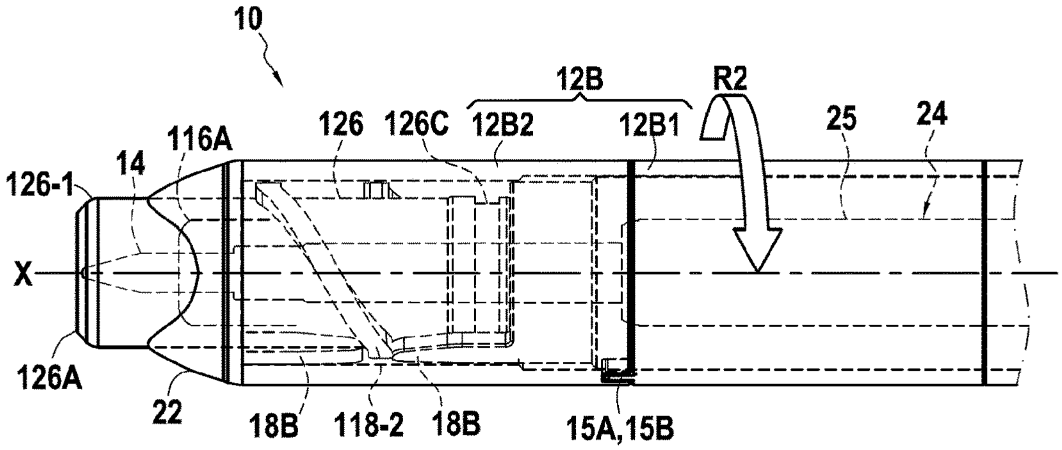
FIG. 12 shows the ink writing instrument of FIG. 7 seen perpendicular to the axis X, the protection being in the protruded position while the eraser is in the retracted position.

As shown in FIGS. 10 to 12, the writing tip 14 is fixed with regard to the body 12 while the eraser 116 and the protection 126 are movable between a retracted position (see FIG. 10) and a protruded position (see FIG. 11 or 12). When the eraser 116 is in the retracted position (see FIG. 10) or in an intermediate position the eraser 116 may not be used and the writing tip 14 may be used for writing. When the eraser 116 is in the protruded position (see FIG. 10), the writing tip 14 may not be used and the eraser 16 may be used for erasing an erasable ink applied with the writing tip 14. When the protection 126 is in the retracted position (see FIG. 10) or in an intermediate position the writing tip 14 may be used for writing. When the protection 126 is in the protruded position (see FIG. 12), the writing tip 14 is protected by the protection 126 and may not be used.

In the present example, the writing tip 14 may be used when both the eraser 116 and the protection 126 are in the retracted position or when one of the eraser 116 and the protection 126 is in the retracted position and the other of the eraser 116 and the protection 126 is in an intermediate position. The writing tip 14 may not be used when one of the eraser 116 and the protection 126 is in the protruded position.

Although the present disclosure is described with reference to specific examples, it is to be understood that these examples are merely illustrative of the principles and applications of the present disclosure. In particular, individual characteristics of the various embodiments shown and/or mentioned may be combined in additional embodiments. Consequently, the description and the drawings should be considered in a sense that is illustrative rather than restrictive.

Additionally, all of the disclosed features of an apparatus may be transposed, alone or in combination, to a method and vice versa.

It is intended that the specification and the examples be considered as exemplary only, with a true scope of the invention being indicated by the following claims.

The invention claimed is:

1. An ink writing instrument comprising a body extending along an axis, the body having a first end and a second end opposed to the first end along the axis, the first end being provided with a writing tip and with an eraser, wherein the writing tip is configured to be fed with ink and the eraser is movable along the axis with regard to the body, the ink writing instrument further comprising a helical-cam propelling mechanism configured to move the eraser along the axis between a retracted position and a protruded position, and the helical-cam propelling mechanism comprising a helical cam radially protruding from one of the eraser and the body, and two cam followers arranged on the other of the eraser and the body, the two cam followers axially sandwiching the helical cam at least when the eraser is moved between the retracted position and the protruded position, the body comprising a first part and a second part rotatable around the axis with regard to the first part and axially coupled with the first part, the second part being provided with the helical cam or the two cam followers, wherein the second part comprises a first portion rotatably mounted with the first part and a second portion rotatably coupled with the first portion, and the first portion is provided with one of the two cam followers and the second portion is provided with the other of the two cam followers.

2. The ink writing instrument according to claim 1, wherein the writing tip is fixed with regard to the body.

3. The ink writing instrument according to claim 1, wherein the eraser and the writing tip are at least in part coaxial, all or part of the eraser is disposed around all or part of the writing tip at least when the eraser is in the retracted position, the writing tip comprising a writing end, and, when the ink writing instrument is seen perpendicular to the axis, the writing end is concealed by the eraser when the eraser is in the protruded position and the writing end is free from the eraser when the eraser is in the retracted position.

4. The ink writing instrument according to claim 1, wherein the eraser is rotatably coupled with the first part, axially slidable with regard to the first part, axially coupled with the second part and rotatable with regard to the second part.

5. The ink writing instrument according to claim 1, wherein the first end is provided with a protection which is distinct from the eraser and is movable along the axis with regard to the body between a retracted position and a protruded position, and the protection is configured to protect the writing tip in the protruded position.

6. The ink writing instrument according to claim 5, wherein the helical-cam propelling mechanism is configured to move the protection along the axis between the retracted position and the protruded position.

7. The ink writing instrument according to claim 5, wherein the helical-cam propelling mechanism comprises a second helical cam, the second helical cam radially protrudes from one of the protection and the body.

8. The ink writing instrument according to claim 5, wherein the helical-cam propelling mechanism is configured to move only one of the eraser and the protection at time.

9. The ink writing instrument according to claim 5, wherein the helical-cam propelling mechanism comprises a stopper configured to axially block one of the eraser and the protection when the other of the eraser and the protection is moved between the retracted position and the protruded position.

10. The ink writing instrument according to claim 5, wherein the protection and the eraser are at least in part coaxial.

11. The ink writing instrument according to claim 5, wherein the protection has at least a portion forming a sleeve around the eraser and the writing tip, the sleeve configure to slide along the axis in order to free a writing end for writing, when in the retracted position, or to conceal the writing end for its protection when in the protruded position.

12. The ink writing instrument according to claim 5, wherein the protection has a cylindrical portion extending along the axis, the cylindrical portion of the protection having an axial length greater than or equal to an axial length of the portion of the writing tip which protrudes axially out of the body.

13. The ink writing instrument according to claim 5, wherein the eraser comprises a first half-cylindrical portion extending along the axis and the protection comprises a second half-cylindrical portion extending along the axis, the first half-cylindrical portion and the second half-cylindrical portion forming a cylindrical casing configured to receive a writing body having a writing end and being configured to slide relatively to each other along the axis when the eraser or the protection is moved between the retracted position and the protruded position.

14. The ink writing instrument according to claim 1, comprising a writing body having a writing end, the writing body being coupled with the second end.

15. The ink writing instrument according to claim 1, wherein the first end is provided with a protective cover fixed with regard to the body.

16. The ink writing instrument according to claim 1, wherein the ink is an erasable ink.

17. The ink writing instrument according to claim 1, wherein the first end is provided with a protective cover that is fixed with respect to the body, wherein the protective cover has at least one cut.

18. The ink writing instrument according to claim 17, wherein the protective cover is configured to be elastically deformed from a rest configuration to a deformed configuration so as to allow passage of the eraser through the at least one cut when the eraser is moved from the retracted position to the protruded position and to return to a rest configuration when the eraser is moved from the protruded position to the retracted position.

19. An ink writing instrument comprising a body extending along an axis, the body having a first end and a second end opposed to the first end along the axis, the first end being provided with a writing tip and with an eraser, wherein the writing tip is configured to be fed with ink and the eraser is movable along the axis with regard to the body, the ink writing instrument further comprising a helical-cam propelling mechanism configured to move the eraser along the axis between a retracted position and a protruded position, and the helical-cam propelling mechanism comprising a helical cam radially protruding from one of the eraser and the body, and two cam followers arranged on the other of the eraser and the body, the two cam followers axially sandwiching the helical cam at least when the eraser is moved between the retracted position and the protruded position, wherein the first end is provided with a protection which is distinct from the eraser and is movable along the axis with regard to the body between a retracted position and a protruded position, and the protection is configured to protect the writing tip in the protruded position.

20. An ink writing instrument comprising a body extending along an axis, the body having a first end and a second end opposed to the first end along the axis, the first end being provided with a writing tip and with an eraser, wherein the writing tip is configured to be fed with ink and the eraser is movable along the axis with regard to the body, the ink writing instrument further comprising a helical-cam propelling mechanism configured to move the eraser along the axis between a retracted position and a protruded position, and the helical-cam propelling mechanism comprising a helical cam radially protruding from one of the eraser and the body, and two cam followers arranged on the other of the eraser and the body, the two cam followers axially sandwiching the helical cam at least when the eraser is moved between the retracted position and the protruded position, wherein the first end is provided with a protective cover that is fixed with respect to the body, wherein the protective cover has at least one cut, and wherein the protective cover is configured to be elastically deformed from a rest configuration to a deformed configuration so as to allow passage of the eraser through the at least one cut when the eraser is moved from the retracted position to the protruded position and to return to a rest configuration when the eraser is moved from the protruded position to the retracted position.

* * * * *